(12) United States Patent
Walch

(10) Patent No.: US 8,121,820 B2
(45) Date of Patent: Feb. 21, 2012

(54) PROGRAM MANAGED DESIGN FOR COMPLEX CONSTRUCTION PROJECTS

(75) Inventor: Mark A. Walch, Woodbridge, VA (US)

(73) Assignee: Gannon Technologies Group, LLC, Alexandria, VA (US)

( * ) Notice: Subject to any disclaimer, the term of this patent is extended or adjusted under 35 U.S.C. 154(b) by 1442 days.

(21) Appl. No.: 11/622,326

(22) Filed: Jan. 11, 2007

(65) Prior Publication Data

US 2007/0198231 A1    Aug. 23, 2007

Related U.S. Application Data

(60) Provisional application No. 60/758,019, filed on Jan. 11, 2006.

(51) Int. Cl.
*G06F 17/50* (2006.01)

(52) U.S. Cl. ............................................. 703/1; 705/400

(58) Field of Classification Search .................. 705/400; 703/1
See application file for complete search history.

(56) References Cited

U.S. PATENT DOCUMENTS

| | | | |
|---|---|---|---|
| 6,922,701 | B1 | 7/2005 | Ananian et al. |
| 6,993,708 | B1 * | 1/2006 | Gillig ............................. 715/234 |
| 6,999,907 | B2 * | 2/2006 | Smith ............................... 703/1 |
| 7,337,151 | B2 * | 2/2008 | Lopez et al. ................... 705/400 |
| 2001/0037190 | A1 * | 11/2001 | Jung .................................. 703/1 |
| 2002/0035451 | A1 | 3/2002 | Rothermel |
| 2002/0129001 | A1 | 9/2002 | Levkoff et al. |
| 2004/0205519 | A1 * | 10/2004 | Chapel et al. ................. 715/502 |
| 2005/0125204 | A1 | 6/2005 | Garcia et al. |
| 2005/0240605 | A1 | 10/2005 | Knoblock et al. |
| 2006/0010081 | A1 * | 1/2006 | Williams .......................... 705/80 |
| 2008/0004844 | A1 * | 1/2008 | Kefford et al. ..................... 703/1 |

OTHER PUBLICATIONS

Janusz Szuba et al., "Graph visualization in ArchiCAD," 2000, LNCS 1779, Springer-Verlag, pp. 241-246.*
Alan J. Filipski et al., "Automated conversion of engineering drawings to CAD form," 1992, Proceeding of the IEEEE, vol. 80, No. 7, pp. 1195-1209.*
Ihsan Faraj et al., "A modularized integrated computer environment for the construction industry: space," 1999, Journal of Information Technology in Construction, vol. 4, pp. 37-52.*
Hassan M. Satti et al., "Issues of integrating building codes in CAD," Dec. 2004, 1st Arab Society for Computer Aided Architectural Design International Conference, Dhahran, Saudi Arabia, pp. 89-107.*
PCT International Search Report for PCT/US2007/60403 filed Jan. 11, 2007.

* cited by examiner

*Primary Examiner* — Paul Rodriguez
*Assistant Examiner* — Russ Guill
(74) *Attorney, Agent, or Firm* — Procopio, Cory, Hargreaves & Savitch LLP; Noel C. Gillespie; Jonathan D. Cheng

(57) ABSTRACT

A method for generating architectural design requirements for a building structure is disclosed. A schematic drawing file of the building structure is loaded. The building type for the building structure is designated. A topology mask identifying the functional zones demarcated by the schematic drawing is created over the schematic drawing. Architectural design standards that are specific to the building type designated are applied to each of the identified functional zones to generate the architectural design requirements for the building structure. The architectural design standards being stored in a relational database.

10 Claims, 10 Drawing Sheets

PROGRAM MANAGED DESIGN FOR COMPLEX CONSTRUCTION PROJECTS

APPLICATIONS FOR CLAIM OF PRIORITY

This application claims the benefit under 35 U.S.C. §119 (e) of U.S. Provisional Application No. 60/758,019 filed Jan. 11, 2006. The disclosure of the above-identified application is incorporated herein by reference as if set forth in full.

BACKGROUND

I. Field of the Invention

The embodiments disclosed in this application generally relate to a project management tool for applying architectural design standards to provide time, cost, and content control over building design projects.

II. Background of the Invention

The design and construction of complex building projects typically require an immense effort in coordinating a multitude of skilled professionals representing various disciplines and functions. Program Managed Design (PMD) is a technique that incorporates the concept of a graph-topology-based data structure to manage complex building design information in a variety of forms ranging from text to database elements to graphic items such as Computer Aided Design (CAD) drawings. PMD maintains data continuity through the facility design process yielding value to a project in three main forms: 1. determining all major design criteria for a given building construction project early on by leveraging off of a comprehensive database of architectural design standards that apply to the project, 2. ensuring design criteria are fulfilled through the design and construction phases of the project by linking programmatic criteria with design elements to ensure responsiveness of the design to the programmatic requirements, and 3. making "contract document" data available at the beginning of a project by merging current construction cost data with details of final project specifications derived from the building schematic drawings.

In short, PMD streamlines and emulates the entire design and construction of a building project by providing a process by which a building is first built "in data" and then transformed into "bricks and mortar." PMD represents a dramatic improvement in the "business process" of Architectural Design and Construction. Design elements are reliably defined during the earliest stages of construction planning allowing for the quantification of the cost and time performance benchmarks for these elements making them available to be audited throughout the course of a project. The name "Program Managed Design" is derived from the fact that the "programmatic" information that is the foundation for design projects is leveraged as a tool to support project management.

SUMMARY

Methods for applying Program Managed Design to provide time, cost, and content control over complex building design projects are disclosed.

In one aspect, a method for generating architectural design requirements for a building structure is disclosed. A schematic drawing file of the building structure is loaded. The building type for the building structure is designated. A topology mask identifying the functional zones demarcated by the schematic drawing is created over the schematic drawing. Architectural design standards that are specific to the building type designated are applied to each of the identified functional zones to generate the architectural design requirements for the building structure. The architectural design standards being stored in a relational database.

In another aspect, a method for creating a graph-based topology mask over a schematic drawing of a building structure is disclosed. A schematic drawing file of the building structure is loaded. Each functional zone demarcated within the schematic drawing is identified with a graphical tag. The schematic drawing is divided into triangles, where each shape pointing a line vector is converted into a vertex in the triangle. The triangles containing the graphical tags are designated as primary triangles. The primary triangles are linked with their adjacent triangles. Each of the linked triangle sets are converted into a polygon. The polygons are combined into a graph-based topology.

In yet another aspect, a method for generating a construction cost estimate for a building structure is disclosed. A schematic drawing file of the building structure is loaded. The building type for the building structure is designated. Each functional zone demarcated within the schematic drawing is identified with a graphical tag. A graph-based topology is built encompassing nodes that represent functional zones and links that represents an adjacencies. Architectural design standards are applied to each of the functional zones identified within the topology to generate architectural design requirements for each of the functional zones. The architectural design requirements are stored in a relational database. The geometric measurements for each of the functional zones demarcated within the schematic drawing are quantified. Construction cost estimates for each of the architectural design requirements are generated using architectural design cost estimation data and the geometric measurement of the functional zones identified. The architectural design cost estimation data is stored in a database.

In still another embodiment, a method for abstracting physical relationships between design elements for a building structure is disclosed. A schematic drawing file of the building structure is loaded. The design elements demarcated within the schematic drawing are identified. The design elements are converted into graphical representations. The graphical representations are linked to form a graph-based topology of the building structure.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

Figure 1A:
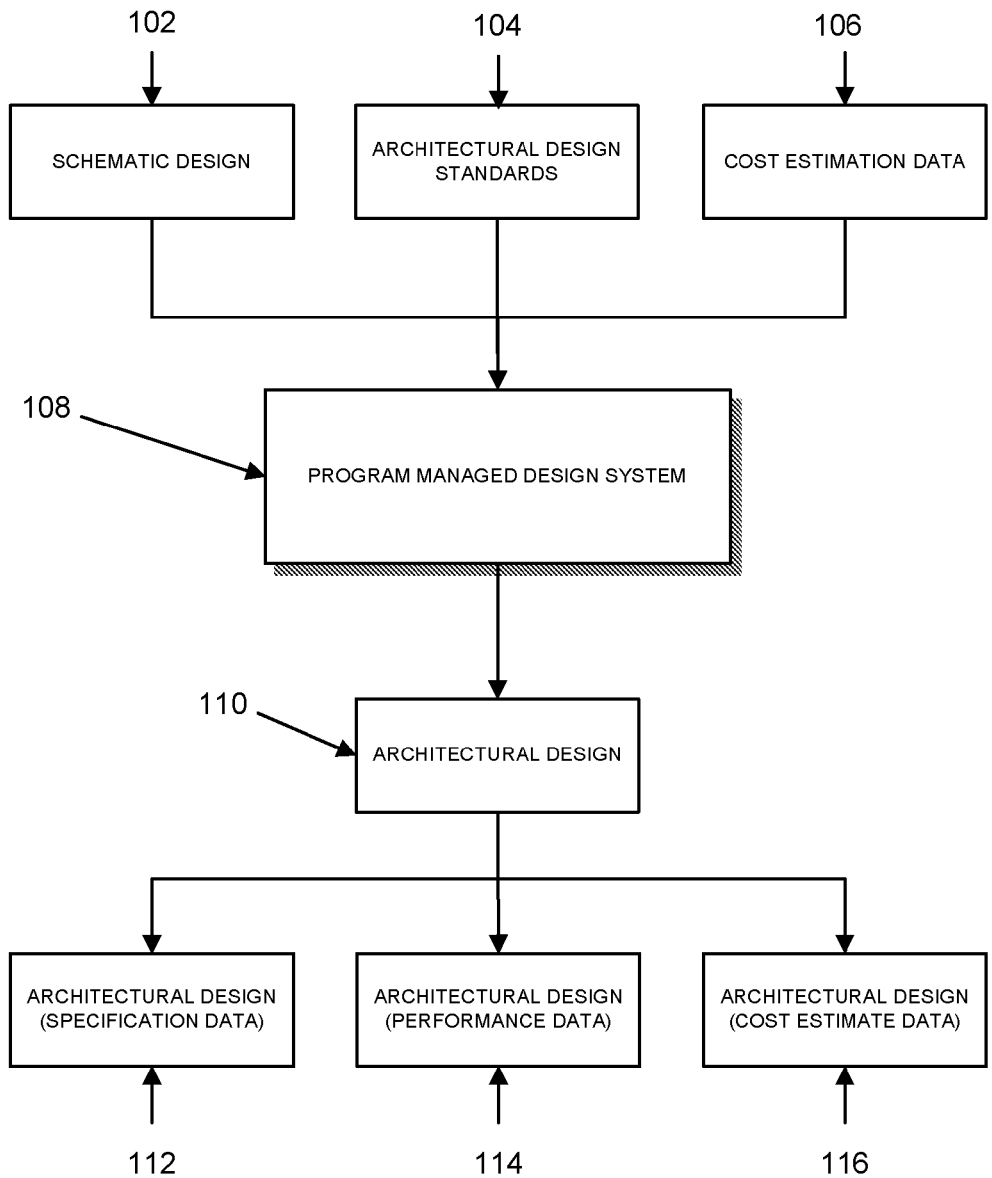
FIG. 1A is an illustration of a flowchart depicting the range of data inputs that are fed into a PMD System and the data outputs that result, in accordance with one embodiment.

Methods for applying Program Managed Design to provide time, cost, and content control over complex building design projects are disclosed. It will be obvious, however, that the present invention may be practiced without some or all of these specific details. In other instances, well known process operations have not been described in detail in order not to unnecessarily obscure the present invention.

As used herein, Program Managed Design (PMD) is a technique that incorporates a graph-topology-based data structure to manage information in a variety of forms to facilitate the planning and execution of complex building construction projects. The graph-topology representations of physical building elements can be supported by a relational database process by which data is extracted and made available for data mining purposes. Data mining is the use of the data derived from data divining for predictive purposes. A schematic drawing topology is a graphical representation that overlays the schematic drawing and can attribute certain properties (e.g., space usages, etc.) to functional spaces represented within the drawing.

For purposes of Architectural Design, "Specification data" includes information relating to materials, means, methods, and systems necessary to create each of the individual design elements that comprise an architectural design. "Performance data" includes information relating to measurable performance criteria for each design element. In essence, the performance data sets the expectation for each design element and serves as the basis for ongoing audits (i.e., data mining) of the architectural design.

FIG. 1A is an illustration of a flowchart depicting the range of data inputs that are fed into a PMD System and the data outputs that result, in accordance with one embodiment. As alluded to earlier, PMD is a tool for the early delivery of data that manage design and construction of complex building construction projects. The PMD System 108 is an implementation of the PMD tool. In one embodiment, the PMD System 108 services are delivered in the form of a software package that can be loaded onto a conventional personal computing device. For example, an individual use copy of software that is purchased by an architectural professional for use on a personal computer. In another embodiment, the PMD System 108 services are delivered in the form of a network application that is stored in a network application server that can be accessed by multiple clients (i.e., users) at the same time to simultaneously manage multiple building construction projects.

As depicted in FIG. 1A, there three main classes of data that are fed into the PMD System: Schematic Design 102, Architectural Design Standards 104, and Cost Estimation Data 106. A Schematic Design Drawing 102 represents the first graphical presentation of an Architectural Design 110 for a building in the form of plans, elevations, sections, and building infrastructure line drawings. The drawings 102 are typically single-line representations showing actual unit spaces, connecting spaces such as corridors and lobbies as well as support spaces dedicated to mechanical and other infrastructure systems. The drawings 102 also show the placement of doors, windows, and other building features within unit spaces in relation to other unit spaces. In one embodiment, the schematic design drawings 102 are stored in the form of a computer aided design (CAD) file. For example, the schematic design drawings 102 can stored in the form of an AUTODESK AUTOCAD™ file. It should be understood, however, that there are many competing architectural CAD formats including but not exclusive to: ARCHICAD™, ARCHIMEDES™, AUTOSKETCH™, DATACAD™, and MEGACAD™. In another embodiment, the schematic design drawings 102 are stored in a paper-based form (such as an architectural blueprint or the like) that is later scanned into an electronic form using a conventional scanning device and then rendered into a digital file format such as an AUTODESK AUTOCAD™ file format, ADOBE ACROBAT™ file format, or other format that can be utilized by the PMD System 108.

Architectural Design Standards 104 denote detailed design criteria such as spatial allocations, materials selection, specifications, and basic construction details used to turn designs into "brick and mortar" structures. In one embodiment, the standards 104 are kept as a collection of records or information stored on a computer in a systematic (i.e., relational) way so that the PMD System 108 can consult the standards 104 to process design inquiries. For example, the Architectural Standards 104 may be compiled as a database that is stored on a network server or similar computing device allowing for access by one or multiple PMD System 108 users. In another embodiment, the standards 104 are stored in written documents (e.g., books, trade industry organization publications such as ISO 12006, etc.) that can be selectively transferred (through scanning and an optical character recognition process) to a computer for temporary storage in a format that allows the PMD System 108 to consult the standards to process design inquiries. For example, a user of the PMD System 108 may upload standards 104 that are published in a trade journal for use in a particular aspect (i.e., HVAC systems) of building design.

Figure 1B:
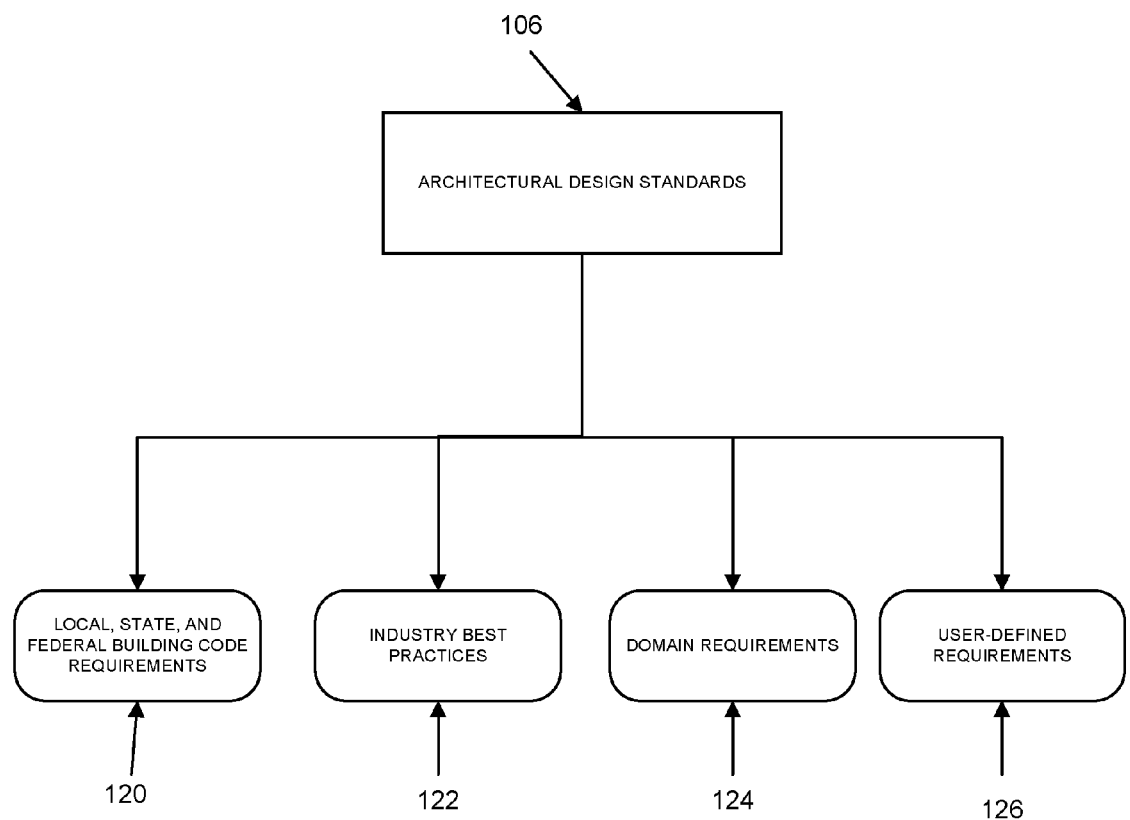
FIG. 1B is an illustration of the various sources of data that the Architectural Design Standards draws from, in accordance with one embodiment.

As shown in FIG. 1B, Architectural Design Standards 104 come from three main sources: Local, State, and Federal Building Code Requirements 120, Industry Best Practices 122, Domain Requirements 124 and User-Defined Requirements 126. Local, State and Federal Building Code Requirements 120 are building design specifications or elements that are required by law under local, state and Federal legislation. Industry Best Practices 122 would be building design requirements that are standardized by one or more standard setting organizations such as the International Standards Organization (i.e., under ISO 12006). Domain Requirements 124 are the specific requirements a space needs to function. These requirements often overlap with other requirements but also contain more specific requirements. User-Defined Requirements 126 are specific design requirements that are entered for particular instances that may deviate from Domain Requirements 124.

Architectural design standards 104 frequently change as building construction techniques improve and as a result of changes brought on by amendments to government legislation. In one embodiment, where the architectural design standards 104 are stored in a database linked to the PMD System 108, the database may be updated periodically through an Internet connection to a server containing updated Architectural Design Standards 104. In another embodiment, where the standards 104 are stored in a database linked to the PMD System 108, the database may be manually updated by a user of the PMD System 108.

Continuing with FIG. 1A, cost estimation data 106 in the construction industry is highly sensitive to market conditions. Construction pricing follows basic economic principles in that it reflects national and local market conditions within the construction industry. When demand for construction services is high (where several projects are placed "on the street" for simultaneous bidding) the prices rise based on demand. Conversely, when demand drops the bid prices also drop. The ability to generate reliable design requirements early on in a project significantly impacts the costs for the project as it allows for the engagement of contractors during downward pricing cycles. Thus, the PMD System 108 allows a user to generate reliable bidding documents during the early stages of building design and planning to realize significant cost savings during the construction phase of a project.

In one embodiment, the cost estimation data 106 is kept as a collection of records stored on a computer in a systematic (i.e., relational) way so that the PMD System 108 can consult the data 106 when generating construction cost estimations for use in bidding documents during the early stages of building design and planning. For example, the cost estimation data 106 may be compiled as a database that is stored on a network server or similar computing device allowing for access by one or multiple PMD System 108 users. In another embodiment, the cost estimation data 106 is manually entered by a user of the PMD System 108 during each use via an interactive process that is keyed to the building design requirements (i.e., Architectural Design 110) that are identified by the PMD System 108 after referencing the building schematic drawings 102 provided by the user and the applicable architectural design standards 104. For example, that PMD System 108 would query the user to input cost estimation data based on the design specifications that have been identified for the particular building design project.

In one embodiment, where the cost estimation data 106 is stored on a database, the data may be updated periodically through an Internet connection to a cost estimation data resource server. The updates can occur automatically during regular periodic intervals (e.g., date/time intervals, etc.) or it can be a one time update that is purchased by a user from the cost estimation data resources website. In another embodiment, a user manually inputs updated cost estimation data 106 to the database on an as needed basis (i.e., as construction market conditions change).

Still with FIG. 1A, after the PMD System 108 receives all the various architectural design inputs (i.e., Schematic Design 102, Architectural Design Standards 104, Cost Estimation Data 106), it processes those inputs to output at an Architectural Design 110 data model for the building construction project. The Architectural Design 110 data model includes project specification data 112, performance data 114, and cost estimate data 116. Specification data 112 encompasses detailed criteria for specific products, materials, building systems, and equipment required for the individual building design elements demarcated within the schematic design drawing. For example, such information would include the width of a door, the height of a room ceiling, the type and heating and air flow capacity required for an examination room (i.e., design element) demarcated within the building. It should be understood that the building design elements may also include system elements such as the HVAC, heating and cooling systems used for the entire building and not just one room. Performance data 114 are criteria that establish performance standards for a building component without specifying a particular product material, or system.

In one embodiment, the performance 114 criteria relate to specific governmental code requirements. In another embodiment, the performance 114 criteria relate to functional requirements of the particular design element. In still another embodiment, the performance 114 criteria relate to aesthetic requirements for the design element. For example, a performance 114 criteria may be that the heating system of the building must be able to heat the building to a temperature of 30° C. when the outside temperature is −15° C. It should be appreciated, however, that the performance 114 criteria may include any combination of the requirements (i.e., governmental code, functional, aesthetic) described above as long as the requirements are presented in a form that is auditable.

Cost estimate data 116 comprises the line item cost estimates for each of the design elements that comprise the building. In one embodiment, these estimates 116 are included within bidding documents that are generated by the PMD System 108 for use in construction bidding. In another embodiment, the cost estimate data 116 is in the form of a spreadsheet that provides for a line item accounting of the costs associated with each of the building design elements identified by the PMD System 108.

Figure 2:
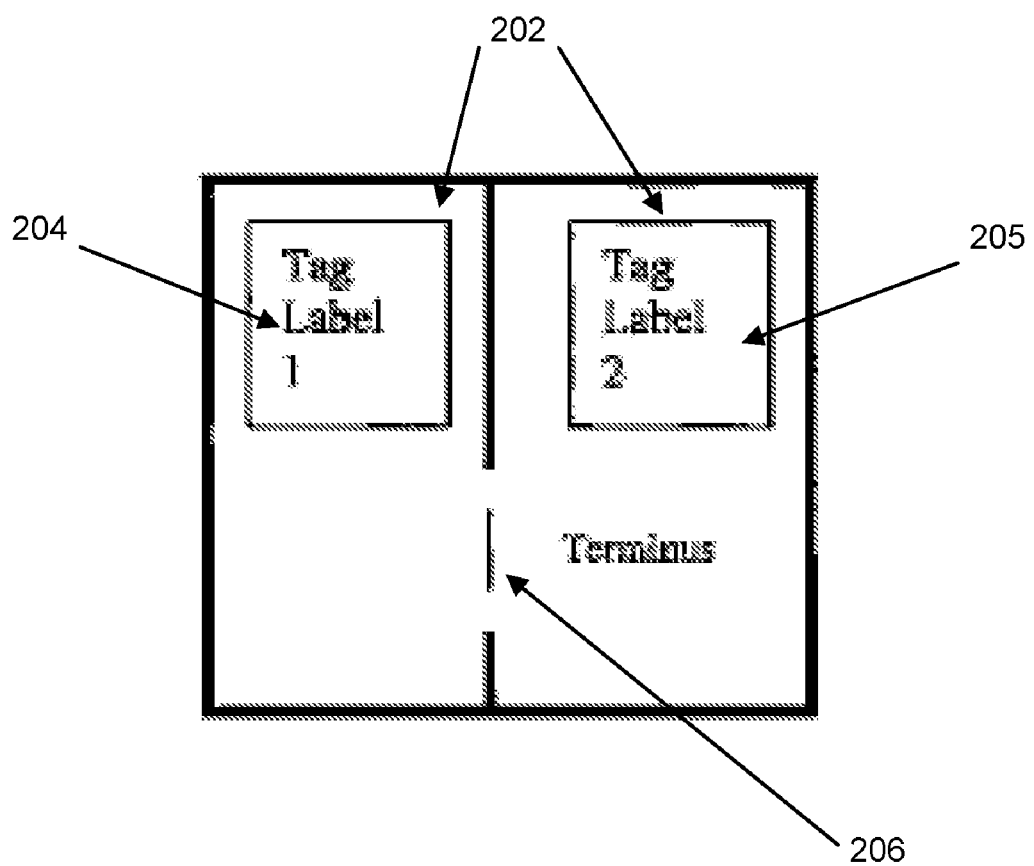
FIG. 2 is an illustration of how two functional areas demarcated on a schematic map are graphically tagged, in accordance with one embodiment.

FIG. 2 is an illustration of how two functional areas demarcated on a schematic map are graphically tagged, in accordance with one embodiment. In order for the PMD System to utilize geometric data from a schematic design drawing to generate a detailed Architectural Design data model (i.e., specification data, performance data, and cost estimates) for the various design elements of a project, a bridge must be built to link the graphical design data captured by the project schematic drawing with the programmatic or tabular data (i.e., Architectural Design Standards and Cost Estimation Data) that is referenced by the PMD System. The result of this linkage is that the detailed specification information (i.e., Architectural Design Standards and Cost Estimation Data) from the PMD System can be linked to the geometric information from the schematic drawings to arrive at a reliable Architectural Design data model for a project.

This linking process is accomplished through the use of "tags" that are embedded by a PMD System user into the schematic drawings. PMD tagging consists of placing graphical tags to identify key functional areas within the schematic drawings. These tags operate in a manner similar to other types of markup-language based tags such as Extensible Mark-up Language (XML) tags. If the objects from the graphical image can be converted into an XML representation, the PMD tags become the same as XML tags. PMD tags mainly establish a cordon around a certain area that distinguishes it from other areas. One discernable difference between a "PMD tag" and a "XML tag" is that the PMD tags are designed to exist in a graphical environment and do not require bracketing around the item of interest. For example, when XML tags are used on text, the tags are used in pairs. One tag occurs at the beginning of the item being tagged, the other occurs following the item. PMD tags may exist individually but do require some sort of terminus condition.

For example, as depicted in FIG. 2, two different rooms 202 are shown as tagged with two different PMD tags (i.e., Tag Label #1 204 and Tag Label #2 205) and a terminus condition 206. A terminus condition 206 occurs when the tag is placed effectively within an area that is either enclosed by walls or specific design features that are depicted in the drawing. Therefore, the terminus condition 206 depicted in FIG. 2 would be the doorway that links the two rooms 202. For example, a single tag with a terminus condition would be a tag placed in the center of a representation of unit space where the unit space is graphically enclosed by objects such as walls, doors, and windows. In this instance, the tag would apply to everything in the unit space including the walls, doors and windows but will not extend to beyond those barriers.

Figure 3A:
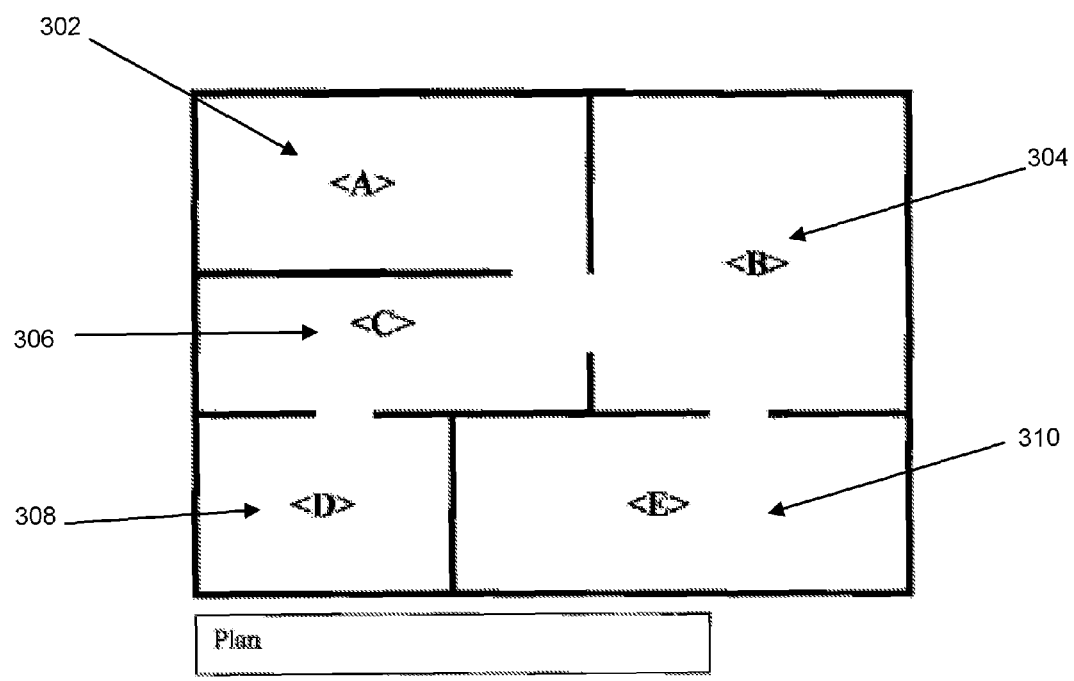
FIG. 3A is an illustration of a schematic drawing with multiple tagged spaces, in accordance with one embodiment.

FIG. 3A, is an illustration of a schematic drawing with multiple tagged spaces, in accordance with one embodiment. As depicted, the schematic drawing includes five different tagged functional areas (i.e., "A" 302, "B" 304, "C" 306, "D" 308, and "E" 310). In one embodiment, the functional areas are tagged with a graphical based tag. In another embodiment, the functional areas are tagged with a markup text tag such as an XML tag. As discussed above, once the various rooms or areas of a schematic drawing has been tagged, a link is established between the drawing and the programmatic data that is utilized by the PMD System to arrive at a reliable Architectural Design for the building project. Tags are markers for specific units of interest which in an architectural floor plan would be unit spaces. Thus, tags are objects that are physically placed in a drawing to indicate the label for a space.

If the architectural floor plan (i.e., schematic design drawing) is created through the use of Computer Aided Design software, the PMD Tag would be a CAD object containing text identifying the label of the "space" being tagged. If the architectural floor plan takes the form of a "paper-based" drawing, the PMD Tag would be a written alphanumeric character sting located within the boundaries of the space being tagged. In this latter case, it will be necessary to scan the paper drawing to convert it into an image and to vectorize the image for processing by the PMD methodology.

Figure 3B:
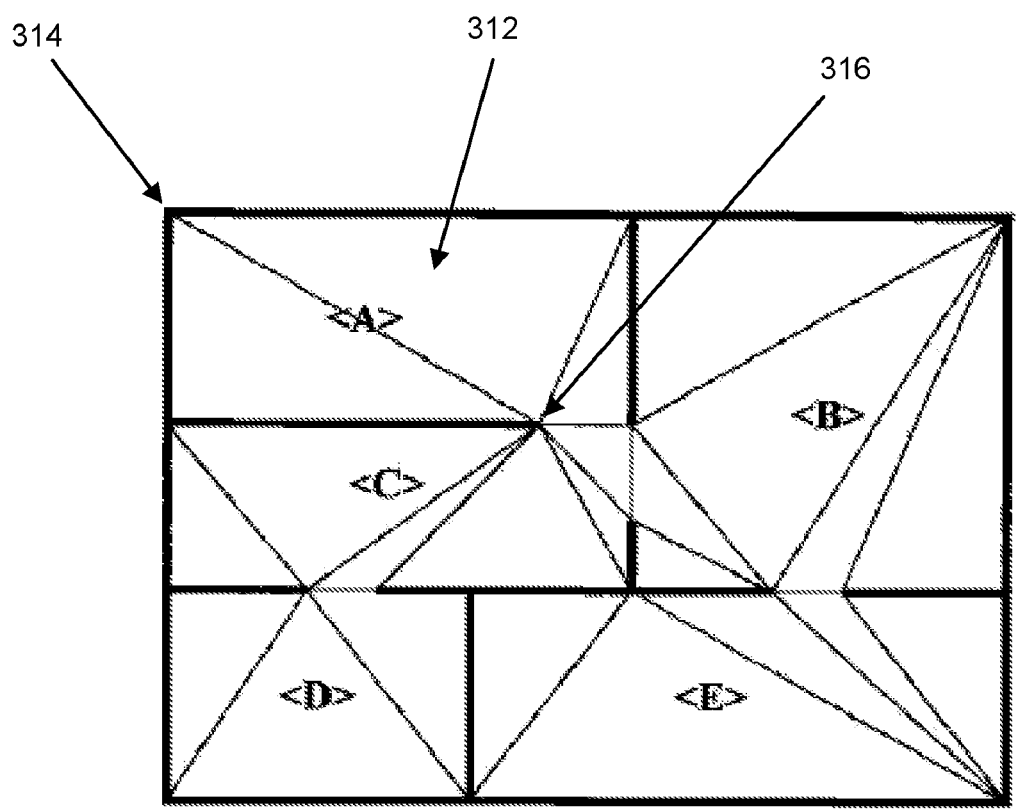
FIG. 3B is an illustration of a schematic drawing once triangulation has occurred, in accordance with one embodiment.

FIG. 3B, is an illustration of a schematic drawing once triangulation has occurred, in accordance with one embodiment. The objective of triangulation is to convert a schematic drawing into a topology that can be represented using graph-based methodologies. A method for creating such a topology is to divide the plan into triangles 312 that are built by connecting key points such as corners 314 and end points 316. Triangles 312 can be created by connecting all the corner 314 and end points 316 until no more connections can be made without crossing other connecting lines. The result is that the entire drawing will now be divided into triangles 312 which can now be grouped together to create a graph-based topology.

Figure 3C:
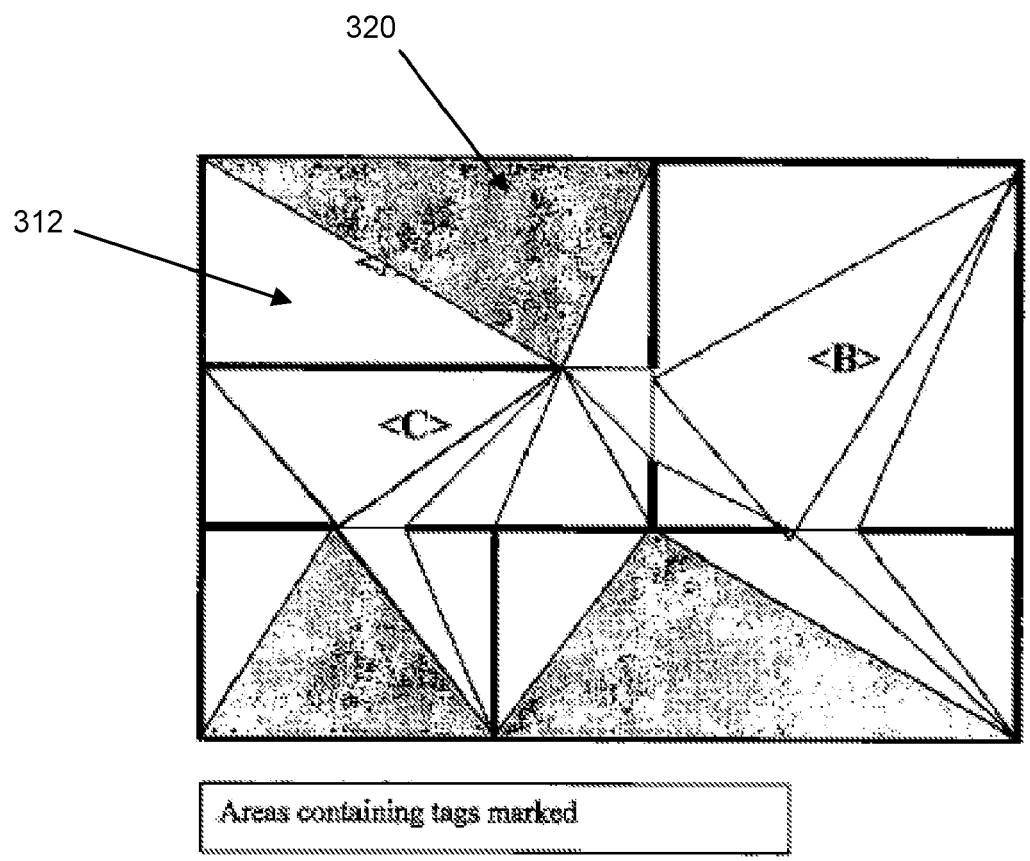
FIG. 3C is an illustration of a topology mask that is created over a schematic drawing, in accordance with one embodiment.

FIG. 3C, is an illustration of a topology mask that is created over a schematic drawing, in accordance with one embodiment. The topology mask is built by grouping triangles 312 within the boundaries of the original drawing. The triangles that contain a graphical tag are termed primary triangles 320. This procedure combines triangles 312 that are located within individual spaces into polygons that approximate the physical area and dimensions of each space.

Figure 3D:
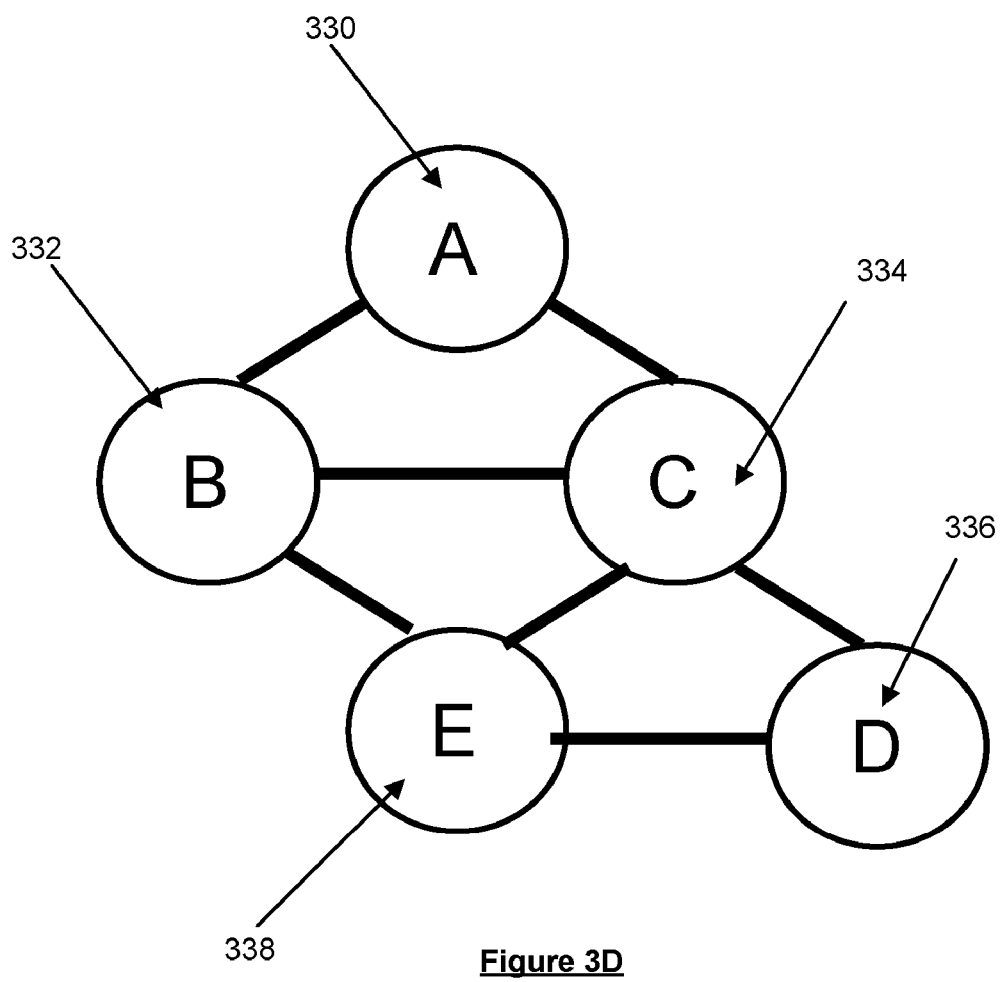
FIG. 3D is an illustration of how nodes and links can be combined to form a graph-based topology, in accordance with one embodiment.

Once the triangles have been grouped into polygons, a graph-based topology can be created from these polygons. FIG. 3D shows this topology. As depicted herein, each space becomes the node within a graph and a physical adjacency between spaces takes the form of a link. In this topology "A" 330 connects to "B" 332 and to "C" 334, "C" 334 connects to "A" 330 and to "B" 332, "B" 332 connects to "A" 330, "C" 334 and "E" 338, "D" 336 connects to "C" 334 and to "E" 338, and "E" 338 connects to "B" 332, "C" 334 and "D" 336. Associated with each node within this topology is the PMD Tag identification and the geometric information extracted by combining triangles into polygons. Associated with each link is the fact that two spaces are adjacent and the actual physical measures associated with the adjacent boundaries. This topology creates the foundation for a data structure that can be used to "bridge" data (in the form of architectural design standards) with geometry (in the form of shapes and physical measures).

Figure 4:
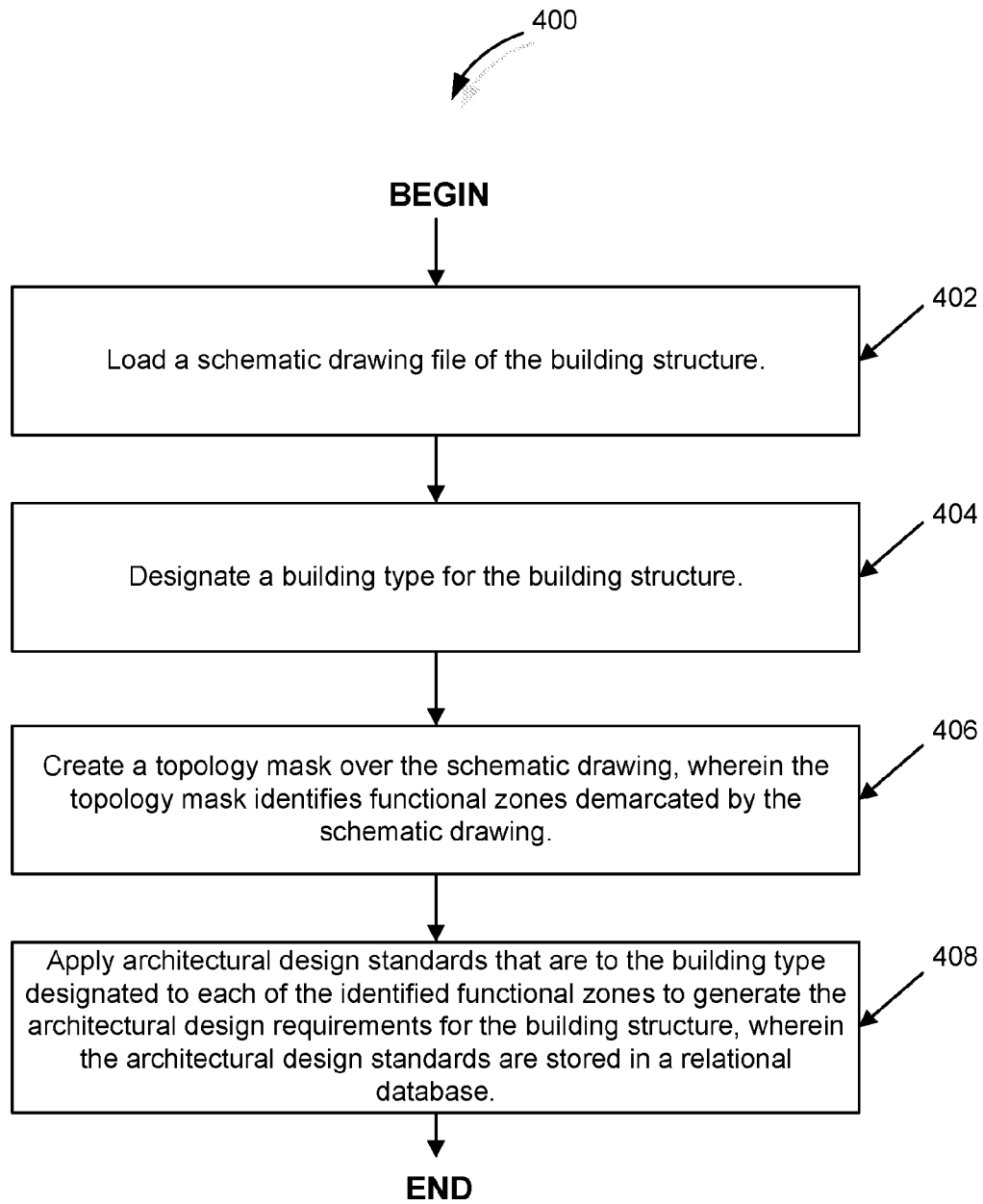
FIG. 4 is an illustration of a flowchart describing the method for generating architectural design requirements for a building structure, in accordance with one embodiment.

FIG. 4 is an illustration of a flowchart describing the method for generating architectural design requirements for a building structure, in accordance with one embodiment. Method 400 begins with operation 402 where a schematic drawing file of the building structure is loaded. In one embodiment, the schematic design drawing file is in a computer aided design (CAD) file format. For example, the schematic design drawing may be an AUTODESK AUTOCAD™ file. In another embodiment, the schematic design drawing is in a paper-based form (such as an architectural blueprint or the like) that is scanned into an electronic form using a conventional scanning device and then rendered into a digital file format such as an AUTODESK AUTOCAD™ file format, ADOBE ACROBAT™ file format, or other format that can be utilized by the PMD System.

Method 400 proceeds on to operation 404 where a building type is designated for the building structure. The set of architectural design standards applied by the PMD System is different depending upon the building type. For example, a building that is used as a semiconductor fabrication facility would have more rigorous fire code requirements (to account for storage of flammable materials and hazardous chemicals) and air quality requirements (clean room environments) than a building that is used as an office building. Therefore, a different set of architectural design standards would apply to a semiconductor fab than to an office building.

Method 400 moves on to operation 406 where a topology mask is created over the schematic drawing, wherein the topology mask identifies functional zones demarcated by the schematic drawing. As discussed previously, the topology mask is built by grouping a series of triangles that are drawn within the boundaries of the schematic drawing. The functional zones are tagged using a graphical tag that is embedded within the topology mask. Tagging creates a link between the graphical design data captured by the project schematic drawing with the programmatic or tabular data (i.e., Architectural Design Standards and Cost Estimation Data) that is referenced by the PMD System. The result of this linkage is that the detailed specification information (i.e., Architectural Design Standards and Cost Estimation Data) from the PMD System can be linked to the geometric information from the schematic drawings to arrive at a reliable Architectural Design data model for a building project.

Method 400 continues on to operation 408 where architectural design standards, specific to the building type designated, are applied to each of the identified functional zones to generate the architectural design requirements for the building structure, wherein the architectural design standards are stored in a relational database. As discussed above, the architectural design requirements are comprised of specification and performance data for the various design elements of the building project. In one embodiment, the database is updated periodically through an Internet connection to a server containing updated Architectural Design Standards. In another embodiment, the database is manually updated by a user of the PMD System.

Figure 5:
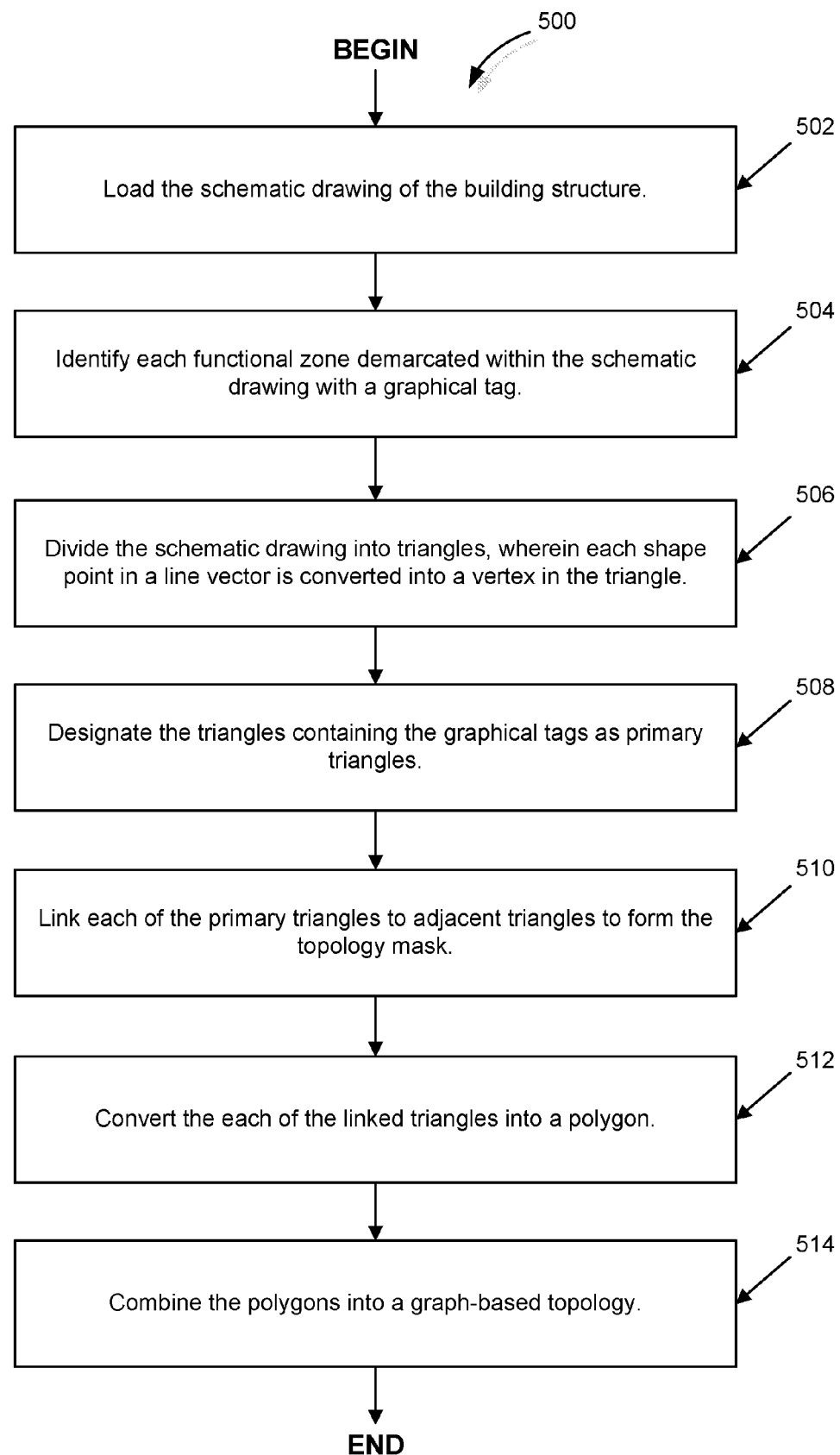
FIG. 5 is an illustration of a flowchart describing the method for creating a graph-based topology mask over a schematic drawing of a building structure, in accordance with one embodiment.

FIG. 5 is an illustration of a flowchart describing the method for creating a graph-based topology mask over a schematic drawing of a building structure, in accordance with one embodiment. Method 500 begins with operation 502 where a schematic drawing file of the building structure is loaded. In one embodiment, the schematic design drawing file is in a computer aided design (CAD) file format. For example, the schematic design drawing may be an AUTODESK AUTOCAD™ file. In another embodiment, the schematic design drawing is in a paper-based form (such as an architectural blueprint or equivalent) that is scanned into an electronic form using a conventional scanning device and then rendered into a digital file format such as an AUTODESK AUTOCAD™ file format, ADOBE ACROBAT™ file format, or other format that can be utilized by the PMD System.

Method 500 continues on to operation 504 where each functional zone demarcated within the schematic drawing is identified with a graphical tag. As discussed above, tagging creates a link between the graphical design data captured by the project schematic drawing with the programmatic or tabular data (i.e., Architectural Design Standards and Cost Estimation Data) that is referenced by the PMD System. The result of this linkage is that the detailed specification information (i.e., Architectural Design Standards and Cost Estimation Data) from the PMD System can be linked to the geometric information from the schematic drawings to arrive at a reliable Architectural Design data model for a building project.

Method 500 moves on to operation 506 where the schematic drawing is divided into triangles, wherein each shape point in a line vector is converted into a vertex in the triangle. As discussed above, the shape point may be either a corner or an endpoint in the schematic drawing. Triangles are created by connecting all the vertices (corner and end points) until no more connections can be made without crossing other connecting lines. The result is that the entire drawing will now be divided into triangles which can be grouped later to create a graph-based topology Method 500 proceeds on to operation 508 where triangles containing the graphical tags are designated as primary triangles. The primary triangles are the "anchors" for a process that aggregates adjacent triangles into polygons.

Method 500 goes on to operation 510 where each of the primary triangles are linked to their adjacent triangles. An adjacent triangle is any triangle that shares a line with a primary triangle. As such, each primary triangle can be linked with up to three adjacent triangles. Thus, a set of linked triangles would include a primary triangle and one or more adjacent triangles.

Method 500 continues on to operation 512 where each of the linked triangles are converted into a polygon. As discussed above, this procedure involves combining linked triangles that are located within individual spaces into polygons that approximate the physical area and dimensions of each space.

Method 500 moves on to operation 514 where the polygons are combined into the graph-based topology. The various polygons formed combine together to cover the entire surface area of the schematic drawing.

Figure 6:
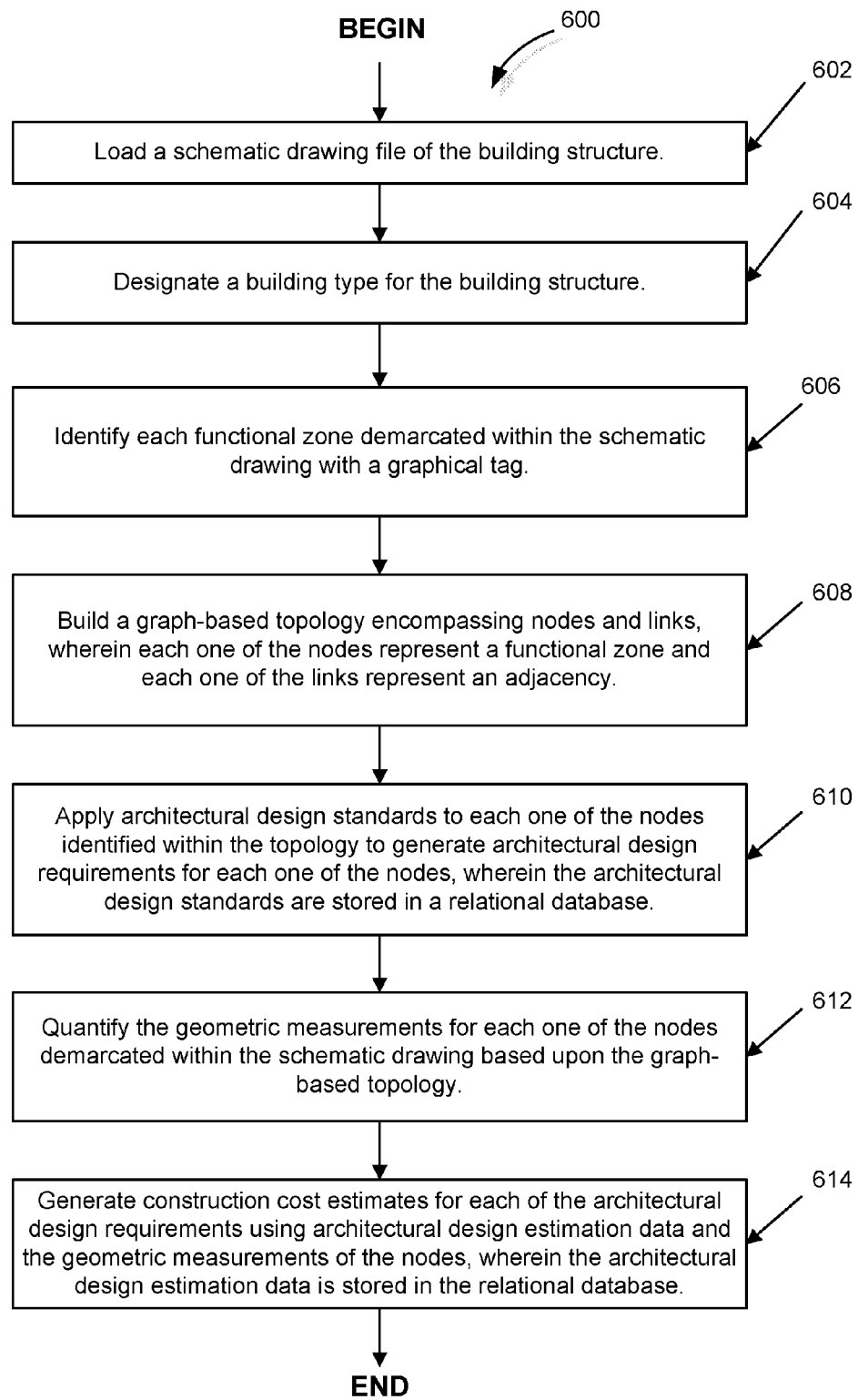
FIG. 6 is an illustration of a flowchart describing the method for generating a construction cost estimate for a building structure, in accordance with one embodiment.

FIG. 6 is an illustration of a flowchart describing the method for generating a construction cost estimate for a building structure, in accordance with one embodiment. Method 600 begins with operation 602 where a schematic drawing file of the building structure is loaded. In one embodiment, the schematic design drawing file is in a computer aided design (CAD) file format. For example, the schematic design drawing may be an AUTODESK AUTOCAD™ file. In another embodiment, the schematic design drawing is in a paper-based form (such as an architectural blueprint or equivalent) that is scanned into an electronic form using a conventional scanning device and then rendered into a digital file format such as an AUTODESK AUTOCAD™ file format, ADOBE ACROBAT™ file format, or other format that can be utilized by the PMD System.

Method 600 proceeds on to operation 604 where a building type is designated for the building structure. As discussed above, the set of architectural design standards applied by the PMD System is different depending upon the building type. For example, a building that is used as a semiconductor fabrication facility would have more rigorous fire code requirements (to account for storage of flammable materials and hazardous chemicals) and air quality requirements (clean room environments) than a building that is used as an office building. Therefore, a different set of architectural design standards would apply to a semiconductor fabrication facility than to an office building.

Method 600 proceeds to operation 606 where each functional zone demarcated within the schematic drawing is identified with a graphical tag. As discussed above, tagging creates a link between the graphical design data captured by the project schematic drawing with the programmatic or tabular data (i.e., Architectural Design Standards and Cost Estimation Data) that is referenced by the PMD System. The result of this linkage is that the detailed specification information (i.e., Architectural Design Standards and Cost Estimation Data) from the PMD System can be linked to the geometric information from the schematic drawings to arrive at a reliable Architectural Design data model for a building project.

Method 600 moves on to operation 608 where a graph-based topology encompassing nodes and links is built, wherein each one of the nodes represent a functional zone and each one of the links represent an adjacency. As discussed above, the topology is created by first dividing the graph up into multiple triangles in a process known as triangulation. The nodes are those "primary" triangles that contain an embedded graphical tag. The primary triangles are the "anchors" for a process that aggregates adjacent triangles into polygons. Building from the primary triangles, adjacent triangles are combined to form polygons. The polygons groupings are constrained by the delimiting lines from the original drawing, so each polygon (i.e. set of grouped triangles) represents a "room" or some form of "unit space" The adjacencies are those polygons that share a boundary with other polygons. In this way, the polygons become surrogates for rooms or other unit spaces and their adjacencies reflect the actual physical adjacencies among spaces.

Method 600 continues on to operation 610 where architectural design standards, stored in a relational database, are applied to each of the functional zones identified within the topology to generate architectural design requirements for each of the functional zones. The architectural design requirements are comprised of specification and performance data for the various design elements of the building project. In one embodiment, the database is updated periodically through an Internet connection to a server containing updated Architectural Design Standards. In another embodiment, the database is manually updated by a user of the PMD System.

Method 600 goes on to operation 612 where geometric measurements for each of the functional zones demarcated within the schematic drawing are quantified. These geometric measurements would include spatial measurements (i.e., room dimensions), equipment dimensions, various other design element measurements (e.g., counters, cabinetry, etc.). The geometric measurements are generated from the polygons built through the triangulation methods discussed above.

Method 600 proceeds on to operation 614 where construction cost estimates for each of the architectural design requirements is generated using architectural design cost estimation data and the geometric measurements of the functional zones identified. The architectural design cost estimation data is stored in a relational database. In one embodiment, the database is updated periodically through an Internet connection to a cost estimation data resource server. The updates can occur automatically during regular periodic intervals (e.g., date/time intervals, etc.) or it can be a one time update that is purchased by a user from a cost estimation data resources website. In another embodiment, a user manually inputs updated cost estimation data to the database on an as needed basis (i.e., as construction market conditions change).

In one embodiment, the cost estimates are included within bidding documents that are generated by the PMD System for use in construction bidding. In another embodiment, the cost estimates are incorporated into a spreadsheet that provides for a line item accounting of the costs associated with each of the building design elements identified by the PMD System.

The embodiments, described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The embodiments described herein can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

The invention claimed is:

1. A method for generating a construction cost estimate for a building structure, comprising:
   loading a schematic drawing of the building structure, the schematic drawing comprising an architectural plan;
   receiving a designation of a building type for the building structure;
   receiving a plurality of tags, each tag identifying a center of a functional zone demarcated within the schematic drawing;
   generating a graph-based topology comprising a plurality of nodes and one or more links by
      dividing the architectural plan into triangles by connecting key points within the architectural plan, the triangles comprising primary triangles and adjacent triangles, wherein each primary triangle comprises one of the plurality of tags,
      linking two or more of the primary triangles with one or more adjacent triangles to form two or more polygons, wherein each one of the two or more polygons corresponds to a functional zone,
      generating the plurality of nodes, each node representing the functional zone corresponding to one of the two or more polygons, and
      generating the one or more links, each link representing an adjacency between two functional zones;
   linking architectural design standards to each of the functional zones identified within the graph-based topology to generate architectural design requirements for each of the functional zones, wherein the architectural design standards comprise design criteria for the building type and are stored in a relational database, and wherein the architectural design requirements comprise at least one of specification data and performance data;
   quantifying geometric measurements for each of the functional zones demarcated within the schematic drawing; and
   generating construction cost estimates for each of the architectural design requirements using architectural design cost estimation data and the geometric measurements of the functional zones identified, wherein the architectural design cost estimation data is stored in the relational database.

2. The method for generating a construction cost estimate for a building structure, as recited in claim 1, wherein, the architectural design standards are based on State and Federal building code standards.

3. The method for generating a construction cost estimate for a building structure, as recited in claim 1, wherein, the architectural design standards are based on industry best practices.

4. The method for generating a construction cost estimate for a building structure, as recited in claim 1, wherein, the architectural design standards are based on user-defined requirements.

5. The method for generating a construction cost estimate for a building structure, as recited in claim 1, wherein, the schematic drawing is in a computer aided design file format.

6. The method for generating a construction cost estimate for a building structure, as recited in claim 1, further including:

extracting an image of the schematic drawing from a paper-based schematic drawing; and converting the image of the schematic drawing into a schematic drawing file.

7. The method for generating a construction cost estimate for a building structure, as recited in claim 1, further including:

updating the architectural design standards by way of a communications connection with an Internet web server.

8. The method for generating a construction cost estimate for a building structure, as recited in claim 1, further including:

updating the architectural design cost estimation data by way of a communications connection with an Internet web server.

9. The method for generating a construction cost estimate for a building structure, as recited in claim 1, wherein connecting key points within the architectural plan comprises connecting key points until no more connections can be made without crossing other connections between key points.

10. The method for generating a construction cost estimate for a building structure, as recited in claim 9, wherein the key points comprise at least one of corners and endpoints.

\* \* \* \* \*